(12) United States Patent
Mai

(10) Patent No.: US 9,525,183 B2
(45) Date of Patent: Dec. 20, 2016

(54) FUEL CELL SYSTEM HAVING TWO FUEL CELL STACKS CONNECTED IN SERIES

(75) Inventor: Bjoern Erik Mai, Dresden (DE)

(73) Assignee: SunFire GmbH, Dresden (DE)

( * ) Notice: Subject to any disclaimer, the term of this patent is extended or adjusted under 35 U.S.C. 154(b) by 1196 days.

(21) Appl. No.: 12/993,556

(22) PCT Filed: Apr. 27, 2009

(86) PCT No.: PCT/DE2009/000606
§ 371 (c)(1),
(2), (4) Date: Nov. 19, 2010

(87) PCT Pub. No.: WO2010/009686
PCT Pub. Date: Jan. 28, 2010

(65) Prior Publication Data
US 2011/0070509 A1 Mar. 24, 2011

(30) Foreign Application Priority Data
Jul. 21, 2008 (DE) .................... 10 2008 033 986

(51) Int. Cl.
| H01M 8/06 | (2016.01) |
| H01M 8/04 | (2016.01) |
| H01M 8/24 | (2016.01) |

(52) U.S. Cl.
CPC ..... *H01M 8/04007* (2013.01); *H01M 8/04141* (2013.01); *H01M 8/04194* (2013.01); *H01M 8/0618* (2013.01); *H01M 8/0637* (2013.01); *H01M 8/249* (2013.01); *H01M 8/2495* (2013.01); *Y02E 60/50* (2013.01)

(58) Field of Classification Search
CPC .......................... H01M 8/0618; H01M 8/0637
USPC .................................................. 429/400–535
See application file for complete search history.

(56) References Cited

U.S. PATENT DOCUMENTS

| 4,917,971 | A | * | 4/1990 | Farooque ...................... 429/425 |
| 5,413,878 | A | | 5/1995 | Williams et al. |
| 5,518,828 | A | | 5/1996 | Senetar |
| 6,033,794 | A | * | 3/2000 | George et al. ................ 429/423 |
| 2005/0089465 | A1 | * | 4/2005 | Anumakonda ........ B01J 12/007 423/418.2 |
| 2005/0106429 | A1 | | 5/2005 | Keefer |
| 2005/0244682 | A1 | | 11/2005 | Meacham |

(Continued)

FOREIGN PATENT DOCUMENTS

| EP | 0263052 B1 * | 2/1991 |
| EP | 1686643 A1 | 8/2006 |

OTHER PUBLICATIONS

International Search Report dated Aug. 24, 2009.

*Primary Examiner* — Jonathan G Leong
(74) *Attorney, Agent, or Firm* — Patent Central LLC; Stephan A. Pendorf

(57) ABSTRACT

The invention relates to a fuel cell system comprising a first exothermally operated fuel cell stack and a second non-exothermally operated fuel cell stack, wherein anode waste gas containing water molecules from the first fuel cell stack can be supplied to the second fuel cell stack, and wherein hydrocarbons can be admixed to the anode waste gas by way of a feed line. According to the invention, it is contemplated that the anode waste gas of the first fuel cell stack can be supplied to the second fuel cell stack in an uncooled state. The invention further relates to a method for operating a fuel cell system.

9 Claims, 1 Drawing Sheet

(56) References Cited

U.S. PATENT DOCUMENTS

2007/0184315 A1  8/2007  Kelly et al.

\* cited by examiner

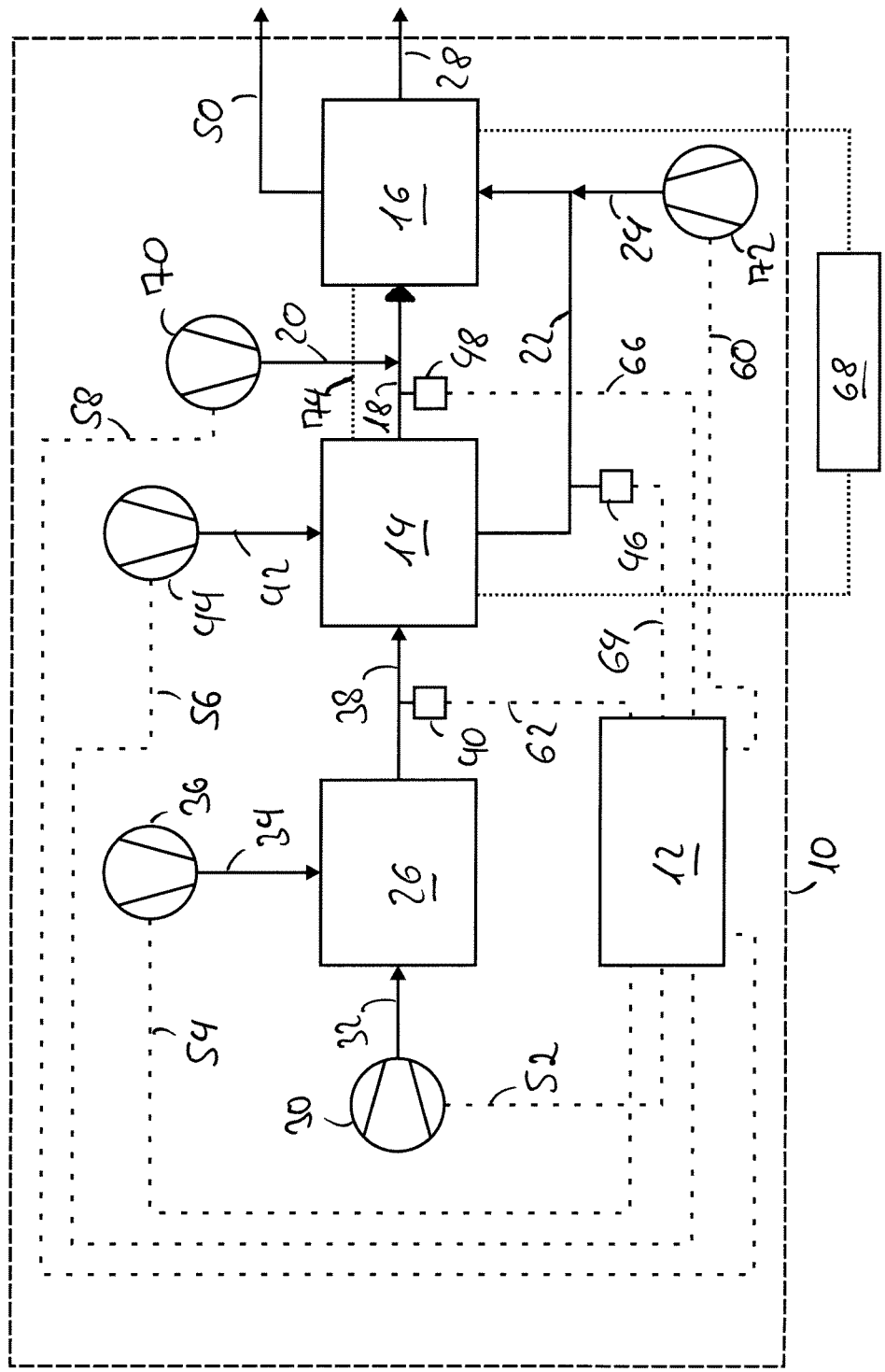

FUEL CELL SYSTEM HAVING TWO FUEL CELL STACKS CONNECTED IN SERIES

CROSS-REFERENCE TO RELATED APPLICATIONS

This Application is a U.S. national phase application filed under 35 U.S.C. §371 of International Application No. PCT/DE2009/000606, filed Apr. 27, 2009, designating the United States, which claims priority from German Patent Application No.: DE 10 2008 033 986.5, filed Jul. 21, 2008, which are hereby incorporated herein by reference in their entirety for all purposes.

The invention relates to a fuel cell system comprising a first exothermally operated fuel cell stack and a second non-exothermally operated fuel cell stack, wherein anode waste gas containing water molecules from the first fuel cell stack can be supplied to the second fuel cell stack, and wherein hydrocarbons can be admixed to the anode waste gas via a feed line.

The invention further relates to a method for operating a fuel cell system comprising a first exothermally operated fuel cell stack and a second non-exothermally operated fuel cell stack, wherein the second fuel cell stack is supplied with anode waste gas containing water molecules from the first fuel cell stack, and wherein hydrocarbons are admixed the anode waste gas to via a feed line.

Fuel cell systems offer a visionary possibility to generate power, owing to their potentially higher efficiency in converting chemical energy into electric energy in comparison to a conventional combustion engine. A fuel cell system comprises, as a central unit, at least one fuel cell stack in which hydrogen-rich reformate supplied to an anode side of the fuel cell stack is converted by cathode air supplied to a cathode side. Electrical power and heat are generated in this process. In order to increase the efficiency of the fuel cell system, it is generally known to further use the waste heat generated during the reaction. This may, for example, take place in the form of heat exchangers supplying the waste heat to an endothermal reforming process in which the hydrogen-rich reformate required for operating the fuel cell is generated. In this regard, it is also known to convert fuel to reformate internally within a fuel cell stack, wherein the required thermal energy must be externally supplied to the fuel cell stack or is generated by the fuel cell stack itself during power generation. Such a fuel cell stack may, for example, function endothermally or autothermally.

However, the efficiency of such fuel cell systems is often unsatisfactory. Therefore, the object of the present invention is to provide a fuel cell system having a simple construction and a high efficiency.

This object is solved by the features of the independent claims.

Advantageous embodiments and further developments of the invention will become apparent from the dependent claims.

The fuel cell system according to the invention is extends beyond the current state of the art in that the anode waste gas from the first fuel cell stack can be supplied to the second fuel cell stack in an uncooled state. Supplying the uncooled anode waste gas from the first fuel cell stack to the second fuel cell stack leads to an increase of the efficiency of the fuel cell system, as the thermal energy discharged from the first fuel cell stack with the anode waste gas can be used for reforming the hydrocarbons admixed to the anode waste gas.

Advantageously, it is also contemplated that the fuel cell system comprises a control unit capable of admixing the hydrocarbons to the anode waste gas from the first fuel cell stack in a molar ratio of the water molecules to the hydrocarbons' carbon atoms of more than one. By admixing hydrocarbons to the anode waste gas from the first fuel cell stack in the described molar ratio, a surplus of fuel is prevented in the subsequent vapour reformation after the introduction into the second fuel cell stack. In this way soot deposition in the second fuel cell stack can be prevented or at least minimised. The admixed hydrocarbons serving as fuel may, in this case, be added to the anode waste gas in gaseous form.

It is particularly preferred that the control unit is capable of admixing the hydrocarbons to the anode waste gas from the first fuel cell stack in a molar ratio of the water molecules to the hydrocarbons' carbon atoms of more than two.

Usefully, it is contemplated here that the cathode waste gas heated in the first fuel cell stack can be supplied to the second fuel cell stack. Supplying the cathode waste gas heated in the first fuel cell stack to the second fuel cell stack also increases the thermal efficiency of the fuel cell systems as a whole.

Preferably, it is contemplated here that the fuel cell system comprises a control unit capable of admixing an oxidant in the form of cooler air to the heated cathode waste gas from the first fuel cell stack for regulating the temperature. The cathode waste gas from the first fuel cell stack can be supplied to the second fuel cell stack as an oxidant in heated form and may be advantageously mixed with another oxidant in the form of cooler fresh air. This enables a temperature regulation of the second fuel cell stack in the form of controlled cooling or, respectively, a controlled lowering of the temperature of the second fuel cell stack or providing a sufficient amount of oxidant to the cathode side of the fuel cell stack. The latter may be required since the anode waste gas from the first fuel cell stack supplied to the second fuel cell stack was supplied with further fuel which should be converted in the second fuel cell stack as completely as possible.

Preferably, it is contemplated that a reformer is provided upstream of the first fuel cell stack. In particular, the hydrogen-rich reformate supplied to the first fuel cell stack may be generated by a reformer, for example, a PDX reformer, which is supplied with fuel and oxidant in the form of air having an air number λ of less than 1. The partial oxidation reformation taking place is an exothermal reaction which proceeds according to the equation

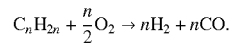

$$C_nH_{2n} + \frac{n}{2}O_2 \rightarrow nH_2 + nCO.$$

Preferably, it is contemplated here that the first fuel cell stack and the second fuel cell stack are electrically connected in series. The series electrical connection of the two fuel cell stacks, for example, by means of a galvanic coupling, enables the supply of a desired electric voltage using a small fuel cell system. A parallel electric connection of the two fuel cell stacks is also feasible. However, a larger fuel cell system would then be required for an equally high electric voltage.

Particularly, it may be contemplated that the second fuel cell stack is an autothermally operated fuel cell stack. The operation of the second fuel cell stack as an autothermal fuel cell stack enables efficient energy utilization in the second fuel cell stack, wherein the endothermal vapour reformation taking place in the second fuel cell stack proceeds according to the equation $C_nH_{2n}+2nH_2O \rightarrow 3nH_2+nCO_2$. The energy required for the endothermal vapour reformation is generated by the subsequent catalytic conversion of the hydrogen gas with oxygen from the oxidant at the fuel cell membrane. Unused hydrogen gas originating from the first fuel cell stack then enters the second fuel cell stack and can also be converted and help to maintain the temperature in the second fuel cell stack. The amount of the hydrogen gas introduced into the second fuel cell stack provides an additional degree of freedom in the operation of the fuel cell system.

It is particularly preferred that the second fuel cell stack is an endothermally operated fuel cell stack and that the first fuel cell stack supplies the thermal energy for the second fuel cell stack. The operation of the second fuel cell stack as an endothermal fuel cell stack or, in other words, that the vapour reformation consumes more energy than the thermal energy subsequently released in the conversion of the generated oxygen gas, is particularly advantageous in regards to efficiency, as the thermal energy from the exothermally operated first fuel cell stack can be transferred via its anode and cathode waste gas to the second fuel cell stack. This type of operation is particularly effective regarding the efficiency of the entire system, as the entire fuel cell system can then work virtually autothermally without generating excess thermal energy.

Usefully, it is contemplated that the additional anode waste gas from the second fuel cell stack is fully discharged from the fuel cell system. The complete discharge of all additional anode waste gas from the second fuel cell stack from the system enables a continuous flow of anode gas through both fuel cell stacks, wherein carbon monoxide or hydrogen gas still perhaps contained in the additional anode waste gas can be burned in an afterburner in order to protect the environment. The thermal energy contained in the additional anode waste gas can be returned to the fuel cell system via a heat exchanger.

The method according to the invention is further developed in that the anode waste gas from the first fuel cell stack is supplied to the second fuel cell stack in an uncooled state. In this manner, the advantages and characteristics of the fuel cell system according to the invention are also implemented within the framework of a method.

This is usefully further developed in that the hydrocarbons are admixed to the anode waste gas from the first fuel cell stack in a molar ratio of the water molecules to the hydrocarbons' carbon atoms of more than one. Soot deposition in the anode gas duct or on the anode side of the fuel cell stacks can be prevented in this manner.

It is particularly preferred that the molar ratio is greater than two.

It is particularly preferred that the cathode waste gas heated in the first fuel cell stack is supplied to the second fuel cell stack.

It may further be contemplated that an oxidant in the form of cooler air is admixed to the heated cathode waste gas from the first fuel cell stack in order to control the temperature. Here, cooler means that the cathode waste gas from the first fuel cell stack has a higher temperature than the admixed air.

Usefully, it may be contemplated that the first fuel cell stack and the second fuel cell stack are operated electrically connected in series.

Particularly, it may be contemplated that the second fuel cell stack is operated autothermally.

In particular, it is preferably contemplated that the second fuel cell stack is operated endothermally and that the thermal energy required for operating the second fuel cell stack is supplied by the first fuel cell stack.

The invention will now be described by way of example with the aid of particularly preferred embodiments with reference to the accompanying drawing:

FIG. 1 is a schematic representation of a fuel cell system according to the invention.

FIG. 1 shows a schematic representation of a fuel cell system according to the invention. In addition to a reformer 26, a fuel cell system 10 comprises a first fuel cell stack 14 and a second fuel cell stack 16, a control unit 12, a fuel supply means 30, a supply means 36, a cathode gas supply device 44, an additional fuel supply means 70 and an additional cathode gas supply device 72. The fuel supply means 30 supplies fuel 32 to the reformer 26 which is further supplied with an oxidant 34, for example, air via the supply means 36, which may, for example, be implemented as a simple fan. The reformer 26 which may, in particular, be implemented as an exothermally operating partial oxidation reformer (abbreviated PDX reformer) converts the fuel 32 into a hydrogen-rich reformate 38. In this regard, it is assumed that the fuel 32 contains hydrocarbons and that the partial oxidation equation takes place according to the following formula:

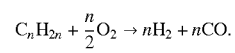

$$C_nH_{2n} + \frac{n}{2}O_2 \rightarrow nH_2 + nCO.$$

The reformate 38 is supplied to the first fuel cell stack 14 as anode gas. A cathode gas 42, for example, air as an oxidant, is supplied to the fuel cell stack 14 by the cathode gas supply device 44. The first fuel cell stack 14 operates exothermally and converts the hydrogen and carbon monoxide rich reformate 38 to water and $CO_2$. In the process, the oxygen ions are removed from the cathode gas 42, which is then converted to water or carbon dioxide together with the hydrogen molecules and/or carbon monoxide present in the reformate 38. The anode waste gas 18 discharged from the first fuel cell stack 14 is, therefore, depleted of oxygen and contains instead additional water. Further, the cathode waste gas 22 contains less oxygen as the cathode gas 42 and is discharged from the first fuel cell stack 14. In comparison to the reformate 38 or the cathode gas 42 flowing into the first fuel cell stack 14, the anode waste gas 18 and the cathode waste gas 22 are heated by thermal energy generated in the first fuel cell stack 14. This cools the first fuel cell stack, as the excessive thermal energy is discharged from the first fuel cell stack 14. This means that the anode waste gas 18 and the cathode waste gas 22 carry at least a part of the process heat generated in the exothermally operated first fuel cell stack 14. The anode waste gas 18 and the cathode waste gas 22 are supplied to the second fuel cell stack 16. The first fuel cell stack 14 and the second fuel cell stack 16 are thus connected in series with respect to the gas flow of the anode and cathode gases. This, in particular, enables an approximately 50% reduction of the cathode gas volume flow, which helps to increase efficiency. Before being introduced into the second fuel cell stack 16, additional hydrocarbons 20 are admixed to the anode waste gas 18 via the additional fuel supply device 70. The molar ratio of the admixed hydrocarbons 20, which may, in particular, be gaseous, is adjusted depending on the water molecules contained in the anode waste gas 18. The molar ratio is selected so that the ratio of the water molecules to the hydrocarbons' carbon atoms is at least greater than one and preferably greater than two. This prevents the depositing of carbon atoms in the form of soot during the subsequent endothermal vapour reformation which takes place in the second fuel cell stack 16. The cathode waste gas 22 can be supplied with an oxidant 24 in the form of non-preheated air via the additional cathode gas supply device 72. In this manner, the temperature level of the cathode waste gas 22 supplied to the second fuel cell stack 16 can be controlled using the supplied amount of oxidant 24. This allows for an enhanced thermal controllability, particularly in the transition phases, i.e. the heating and cooling phases, of the fuel cell system. The second fuel cell stack 16 can be operated either endothermally or autothermally. If the second fuel cell stack 16 is operated endothermally, the additional thermal energy required for its operation is transferred from the first fuel cell stack 14 via the anode waste gas 18 and cathode waste gas 22 to the second fuel cell stack 16. In this type of operation, more thermal energy is required for vapour reformation than is generated by the catalytic power generation in the second fuel cell stack 16. Additional anode waste gas 28 and cathode waste gas 50 exiting the second fuel cell stack 16 are discharged from the fuel cell system 10. Before discharge, however, it is possible to conduct an afterburning of carbon monoxide or oxygen gas still perhaps contained in the additional anode waste gas 28 in an afterburner (not shown) in order to protect the environment. Further thermal energy contained in the additional anode waste gas 28 and additional cathode waste gas 50 can be returned to the fuel cell system 10 via a heat exchanger (also not shown). The first fuel cell stack 14 and the second fuel cell stack 16 are connected in series via a galvanic coupling 74 and supply a consumer 68 with electric power.

The control unit 12 controls the capacity of the pictured individual supply devices 30, 36, 44, 70 and 72 via a first control line 52, a second control line 54, a third control line 56, a fourth control line 58 and a fifth control line 60 which are respectively coupled to one of the supply devices 30, 36, 44, 70 and 72. The control unit 12 controls the capacity of the individual supply devices 30, 36, 44, 70 and 72 based upon the measurement values received by sensor means 40, 46 and 48 via sensor lines 62, 64 and 66. The sensor means 40, 46 and 48 may, for example, detect temperatures, oxygen content, hydrogen content and water content in the respective gas flows.

The features of the invention disclosed in the above description, in the drawings as well as in the claims may be important for the realisation of the invention individually as well as in any combination.

The invention claimed is:

1. A fuel cell system comprising:
   a first fuel supply means for supplying a hydrocarbon containing fuel,
   an oxidant supply means for supplying oxidant,
   an exothermally operating partial oxidation reformer in which said fuel and oxidant are converted into a carbon-monoxide and hydrogen rich reformate,
   a first exothermally operated fuel cell stack downstream of the reformer, in which said carbon-monoxide and hydrogen rich reformate, as anode gas, and a cathode gas are converted to water and $CO_2$, discharging an anode waste gas depleted of oxygen and containing instead additional water, and discharging cathode waste gas, said anode and cathode waste gas heated by thermal energy generated in the first fuel cell stack and thereby removing thermal energy from the first fuel cell stack,
   a second, non-exothermally operated fuel cell stack in which vapour reformation taking place is endothermal, wherein said first fuel cell stack and said second fuel cell stack are electrically connected in series with respect to the gas flow of the anode and cathode gases, and
   a second fuel supply means for admixing additional hydrocarbons to the anode waste gas before being introduced into the second fuel cell stack,
   a control unit which controls operation of the fuel cell system so that the first fuel cell stack is operated exothermally, the second fuel cell stack is operated non-exothermally, and so that heated anode waste gas containing water molecules from the first fuel cell stack is supplied to the second fuel cell stack in an uncooled state whereby the thermal energy from the exothermally operated first fuel cell stack is transferred via its anode and cathode waste gas to the second fuel cell stack for supplying the energy for endothermal vapour reformation in the second fuel cell stack, and wherein the control unit controls admixing the hydrocarbons to the anode waste gas from the first fuel cell stack in a molar ratio of water molecules to the hydrocarbons' carbon atoms of more than one.

2. The fuel cell system of claim 1, wherein the control unit controls admixing the hydrocarbons to the anode waste gas from the first fuel cell stack in a molar ratio of water molecules to the hydrocarbons' carbon atoms of more than two.

3. The fuel cell system of claim 1, wherein the cathode waste gas heated in the first fuel cell stack is supplied to the second fuel cell stack.

4. The fuel cell system of claim 3, wherein the fuel cell system comprises a control unit capable of admixing an oxidant in the form of cooler air to the heated cathode waste gas from the first fuel cell stack for regulating the temperature.

5. The fuel cell system of claim 1, wherein the first fuel cell stack and the second fuel cell stack are electrically connected in series.

6. The fuel cell system of claim 1, wherein the second fuel cell stack is an autothermally operated fuel cell stack.

7. The fuel cell system of claim 1, wherein the second fuel cell stack is an endothermally operated fuel cell stack, and the first fuel cell stack supplies the thermal energy for the second fuel cell stack.

8. The fuel cell system of claim 1, wherein additional anode waste gas from the second fuel cell stack is completely discharged from the fuel cell system.

9. A fuel cell system comprising:
   a first fuel supply device for supplying a hydrocarbon containing fuel,
   an oxidant supply device for supplying oxidant,
   an exothermally operating partial oxidation reformer in which said fuel and oxidant are converted into a carbon-monoxide and hydrogen rich reformate,
   a first exothermally operated fuel cell stack downstream of the reformer, in which said carbon-monoxide and hydrogen rich reformate, as anode gas, and a cathode gas are converted to water and $CO_2$, discharging an anode waste gas depleted of oxygen and containing instead additional water, and discharging cathode waste gas, said anode and cathode waste gas heated by thermal energy generated in the first fuel cell stack and thereby removing thermal energy from the first fuel cell stack,
   a second, non-exothermally operated fuel cell stack in which vapour reformation taking place is endothermal, wherein said first fuel cell stack and said second fuel cell stack are electrically connected in series with respect to the gas flow of the anode and cathode gases, and a second fuel supply device for admixing additional hydrocarbons to the anode waste gas before being introduced into the second fuel cell stack, a control unit which controls, via respective supply lines, gas flows from the first fuel supply device, the oxidant supply device, and the second fuel supply device of the fuel cell system based upon measurement values measured by sensor means via sensor lines, said measurement values include at least one of temperature, oxygen content, hydrogen content and water content in the respective gas flows, so that the first fuel cell stack is operated exothermally, the second fuel cell stack is operated non-exothermally, and so that heated anode waste gas containing water molecules from the first fuel cell stack is supplied to the second fuel cell stack in an uncooled state whereby the thermal energy from the exothermally operated first fuel cell stack is transferred via its anode and cathode waste gas to the second fuel cell stack for supplying the energy for endothermal vapour reformation in the second fuel cell stack, and wherein the control unit controls admixing the hydrocarbons to the anode waste gas from the first fuel cell stack in a molar ratio of water molecules to the hydrocarbons' carbon atoms of more than one.

\* \* \* \* \*